Aug. 19, 1930. T. M. EHLER 1,773,424
CLEAR VISION DEVICE
Filed Feb. 20, 1929
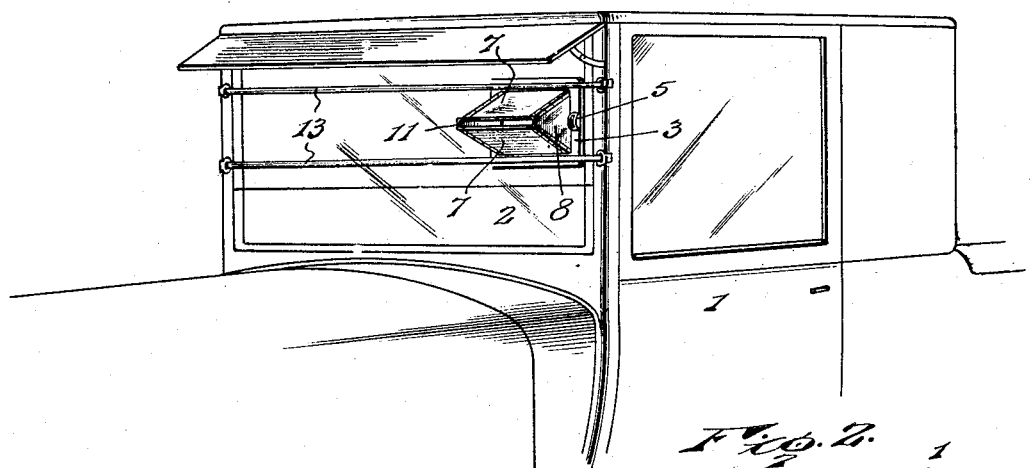
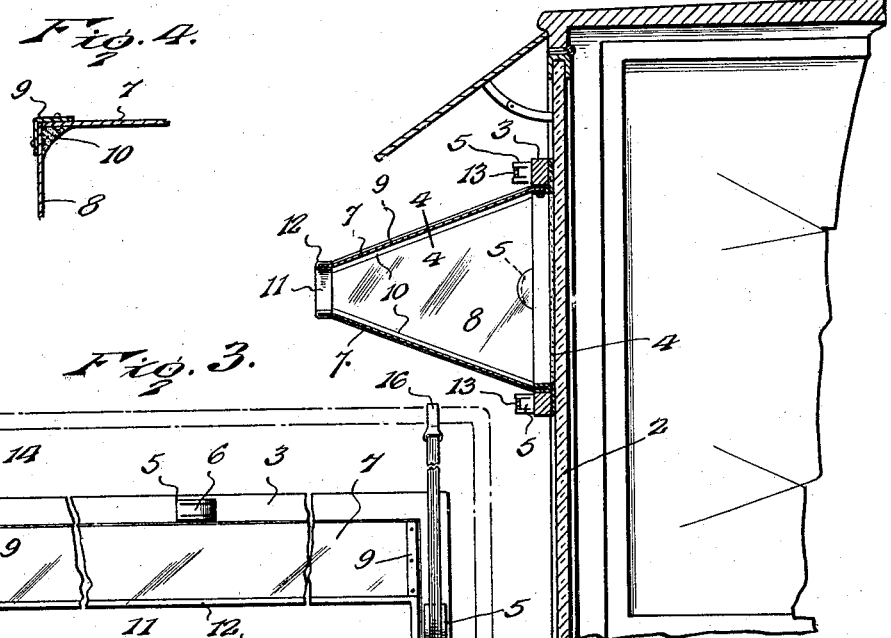
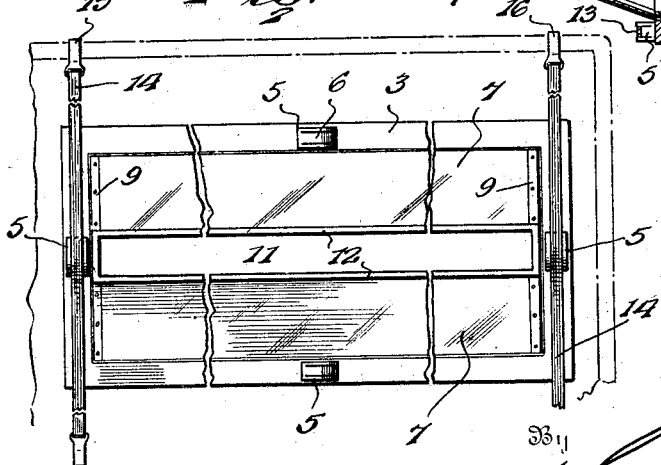
Inventor
T. M. Ehler.

Patented Aug. 19, 1930

1,773,424

UNITED STATES PATENT OFFICE

TEMOTHOUS M. EHLER, OF SLATER, MISSOURI

CLEAR-VISION DEVICE

Application filed February 20, 1929. Serial No. 341,487.

The object of this invention is to provide a simple and inexpensive device which may be easily applied to or removed from the windshield of an automobile or other vehicle and by its use provide a clear vision area notwithstanding stormy climatic conditions. The invention is illustrated in the accompanying drawing and will be hereinafter fully set forth.

In the drawing:

Figure 1 is a perspective view showing one application of my device,

Fig. 2 is an enlarged central vertical section,

Fig. 3 is a front elevation showing a different application of the invention, and Fig. 4 is an enlarged detail section on the line 4—4 of Fig. 2.

In the drawing, the reference numeral 1 indicates a portion of an automobile, and 2 the usual windshield provided thereon. My clear vision device comprises a rigid frame 3 which is preferably rectangular and may be constructed of wood or other material. The rear side of this frame is covered with felt, rubber or some similar material, indicated at 4, whereby light pressure of the same against a windshield will effect an air-tight joint therewith. On the outer side of the frame 3 are lugs 5 having grooves 6 extending across their front faces and preferably convex on their outer sides. One of these lugs is provided on each member of the frame and the purpose thereof will presently appear. Secured to the inner surface of each member of the frame 3 is a transparent sheet of material which is preferably celluloid or the like for the sake of economy and avoidance of weight, but it will be understood that these sheets may be of glass or any other transparent material. As shown clearly in Figs. 1 and 2, the top and bottom sheets 7 converge forwardly while the end sheets 8 are disposed in vertical parallel planes. The meeting edges of the several sheets are covered with any light material, indicated at 9, and in the angles defined by the meeting edges are fillings 10 of wax or similar material whereby an air-tight joint will be effected. The binding strip 9 may be sewed or otherwise attached to the sheets 7 and 8 and light rivets will preferably be employed for this purpose. The front edges of the top and bottom sheets are spaced apart to define a narrow slot or sight opening 11, and in order to maintain the form of this opening against distortion, a reinforcing rim 12 of metal is preferably provided around the same, as shown clearly in Figs. 2 and 3. In applying the device to the vehicle, straps, such as shown at 13, are disposed across the frame of the device and engaged with the lugs or projections 5 so that the device is held closely to the windshield but may be readily shifted to meet the convenience or desires of the chauffeur. In Figs. 1 and 2, the straps 13 are shown extending horizontally across the windshield and engaged with the lugs or projections 5 on the top and bottom of the frame. With this arrangement, the ends of the straps are fastened in any convenient or preferred manner to the frame of the vehicle body but they may, of course, be fastened to the windshield frame. With some models of automobiles, its is not feasible to dispose the retaining straps horizontally and in such case the straps may be disposed vertically, as shown at 14 in Fig. 3. In this arrangement, the straps, of course, engage the lugs on the end members of the frame 3. The retaining straps may be equipped with hooks, as indicated at 15, or otherwise equipped so as to be engaged with the windshield, the windshield frame or projections on the vehicle body.

It will be understood that the device is to be so disposed upon the windshield that the sight opening or slot 11 will be located directly in front of the eyes of the chauffeur. Inasmuch as the frame is held against the windshield with an air-tight joint, there will be no circulation of air through the device and any air which enters through the slot 11 when the vehicle is in motion will be merely trapped therein and somewhat compressed so that snow or rain cannot be drawn through the sight opening which will always remain clear so that the chauffeur will have an unobstructed view of the road ahead. Actual tests of this device have demonstrated that in foggy or inclement weather the vehicle may be safely driven at a high speed as the chauffeur's view is clear and not bedimmed by any deposits. It is, of course, possible that there may be some slight deposits upon the top sheet 7 of the device but the bottom sheet 7 will always be clear and the side or end sheets being disposed vertically will, of course, tend to shed any snow or rain which might tend to collect thereon. The retaining straps firmly hold the clear vision device to the windshield while at the same time the device may be readily shifted in its position as circumstances may demand. The device embodying the invention is very light and may be produced at an exceedingly low cost and may be applied to any windshield without requiring the services of a skilled mechanic or the use of any particular tools. While the device is intended more particularly for use upon motor vehicles, it may, of course, be used advantageously upon motor boats, aeroplanes or any other vehicles which are intended to be driven at high speed.

Having thus described the invention, I claim:

A clear vision device for vehicles comprising a rigid frame provided with projections on its front side at its ends and at its top and bottom, said projections having convex front surfaces and having grooves across said surfaces, a transparent shell secured to and projecting forwardly from the frame and having a narrow sight opening at its front end, said frame projecting outwardly about the margins of the rear end of the shell and the projections disposed outside the shell, and attaching straps secured at their ends and having their intermediate portions passing over the projections on the frame and seating in the grooves therein whereby to hold the device to a windshield.

In testimony whereof I affix my signature.

TEMOTHOUS M. EHLER.